United States Patent
Hayashi

(10) Patent No.: US 9,228,547 B2
(45) Date of Patent: Jan. 5, 2016

(54) APPARATUS FOR GENERATING ENGINE INTAKE AIR TURBULENCE

(71) Applicant: DENSO CORPORATION, Kariya, Aichi-pref. (JP)

(72) Inventor: Hideki Hayashi, Takahama (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 13/928,918

(22) Filed: Jun. 27, 2013

(65) Prior Publication Data

US 2014/0000545 A1     Jan. 2, 2014

(30) Foreign Application Priority Data

Jun. 29, 2012   (JP) ................................ 2012-147844

(51) Int. Cl.
| | |
|---|---|
| *F02B 31/06* | (2006.01) |
| *F02M 35/10* | (2006.01) |
| *F02D 9/10* | (2006.01) |

(52) U.S. Cl.
CPC ............... *F02M 35/10* (2013.01); *F02B 31/06* (2013.01); *F02D 9/103* (2013.01); *Y02T 10/146* (2013.01)

(58) Field of Classification Search
CPC ..... F02B 31/06; F02B 35/10; F02B 35/10006
USPC ................... 123/184.56, 306, 308, 336, 337, 123/184.21; 180/68.3
See application file for complete search history.

(56) References Cited

U.S. PATENT DOCUMENTS

| | | | | |
|---|---|---|---|---|
| 5,992,400 | A * | 11/1999 | Meiwes ........................ | 123/586 |
| 2001/0023677 | A1 | 9/2001 | Fujieda et al. | |
| 2005/0109970 | A1 | 5/2005 | Masui et al. | |
| 2006/0157027 | A1 * | 7/2006 | Ichikawa et al. ............... | 123/399 |
| 2007/0144483 | A1 * | 6/2007 | Torii et al. ..................... | 123/337 |
| 2010/0251987 | A1 | 10/2010 | Sano | |

FOREIGN PATENT DOCUMENTS

| | | |
|---|---|---|
| JP | 63-020509 | 1/1988 |
| JP | 2008-303804 | 12/2008 |
| JP | 2012-026288 | 2/2012 |

OTHER PUBLICATIONS

Office Action (2 pages) dated Apr. 15, 2014, issued in corresponding Japanese Application No. 2012-147844 and English translation (2 pages).

* cited by examiner

*Primary Examiner* — Lindsay Low
*Assistant Examiner* — Kevin Lathers
(74) *Attorney, Agent, or Firm* — Nixon & Vanderhye P.C.

(57) ABSTRACT

An apparatus has a turbulence generator valve which is arranged in an intake air passage. The valve generates turbulence in a cylinder of an engine. The valve receives an intake flow torque TA by flow of intake air. The valve is driven by an electric motor in an electric actuator. Reverse transmission torque TB is necessary to rotate the electric motor in the electric actuator when the electric motor is not activated. A cancel spring is provided to apply a cancel torque TC to the valve. The torques are set to satisfy $|TA+TC|<|TB|$. As a result, it is possible to keep a valve opening degree of the valve while the electric actuator is not activated.

4 Claims, 4 Drawing Sheets

US 9,228,547 B2

APPARATUS FOR GENERATING ENGINE INTAKE AIR TURBULENCE

CROSS REFERENCE TO RELATED APPLICATION

This application is based on Japanese Patent Application No. 2012-147844 filed on Jun. 29, 2012, the disclosure of which is incorporated herein by reference.

TECHNICAL FIELD

The disclosure relates to an apparatus for generating engine intake air turbulence.

BACKGROUND

An apparatus for generating engine intake air turbulence is proposed. In order to suppress the pressure loss in the maximum valve opening degree, it is avoided to use a butterfly valve for a turbulence generator valve. Instead, a cantilever valve or a rotary valve is used as a turbulence generator valve. For example, JP4556864B (US2007144483A1) discloses one.

Since the butterfly valve usually has a rotatable shaft on a center of a movable valve member, it is possible to reduce rotating torque caused by an intake air flow. Hereinafter, the rotating torque caused by the intake air flow may be referred to as an intake flow torque TA. However, the rotary valve may receives larger intake flow torque TA, since the rotary valve is un rotating torque (intake flow torque TA is asymmetrical about a rotatable shaft.

As a concrete example, in a case of a cantilever valve, an intake flow torque TA becomes the maximum when the valve is fully closed, 0% of a valve opening degree (VD), and becomes the minimum when the valve is fully opened, 100% of VD. An example is shown in FIG. 2.

SUMMARY

Due to the above mentioned large intake flow torque TA acting on the turbulence generator valve, the turbulence generator valve may be rotated by the intake flow torque TA. For example, when an electric actuator for moving the turbulence generator valve is not activated by not supplying electric power, it may be difficult to keep the valve opening degree.

In addition, in recent years, in order to adjust turbulence for engine operating condition, the demand for keeping the turbulence generator valve at an intermediate opening degree is increasing.

However, in the intermediate opening degree, the turbulence generator valve is not able to be held by using a mechanical stopper. For this reason, it becomes more difficult to avoid the turbulence generator valve from being rotated by the intake flow torque TA.

It is an object of the disclosure to provide an apparatus for generating engine intake air turbulence being capable of keeping a valve opening degree when the electric actuator is not activated.

It is another object of the disclosure to provide an apparatus for generating engine intake air turbulence being capable of keeping a valve opening degree when the electric actuator is not supplied with electric power.

According to the disclosure, an apparatus for generating engine intake air turbulence is provided. The apparatus has a turbulence generator valve which is arranged in an intake air passage, and generates turbulence in a cylinder of an engine. The apparatus has an electric actuator which drives the turbulence generator valve by an electric motor. The apparatus has a cancel spring which applies force to the turbulence generator valve. The turbulence generator valve receives an intake flow torque TA which is a rotating torque applied to the turbulence generator valve by flow of intake air. The electric actuator requires a reverse transmission torque TB which is a rotating torque necessary to rotate the electric motor in the electric actuator when the electric motor is not activated.

The cancel spring applies the force to the turbulence generator valve in a reverse direction to the intake flow torque TA to apply a cancel torque TC which is a rotating torque applied to the turbulence generator valve. The cancel torque TC is set so that a total torque TD including the intake flow torque TA and the cancel torque TC applied to the turbulence generator valve is set smaller than the reverse transmission torque TB.

Even if the turbulence generator valve receives an intake flow torque TA when the electric actuator is not activated, it is possible to keep the valve opening degree of the turbulence generator valve.

For example, it is possible to keep the turbulence generator valve in its intermediate opening degree during the electric actuator is not activated. As a result, it is possible to improve durability by reducing actively driving the electric actuator and the valve. It is possible to reduce electric power consumption to keep the opening degree. In some cases, it may be possible to reduce backlash on a drive train between the electric motor and the turbulence generator valve by the cancel spring.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
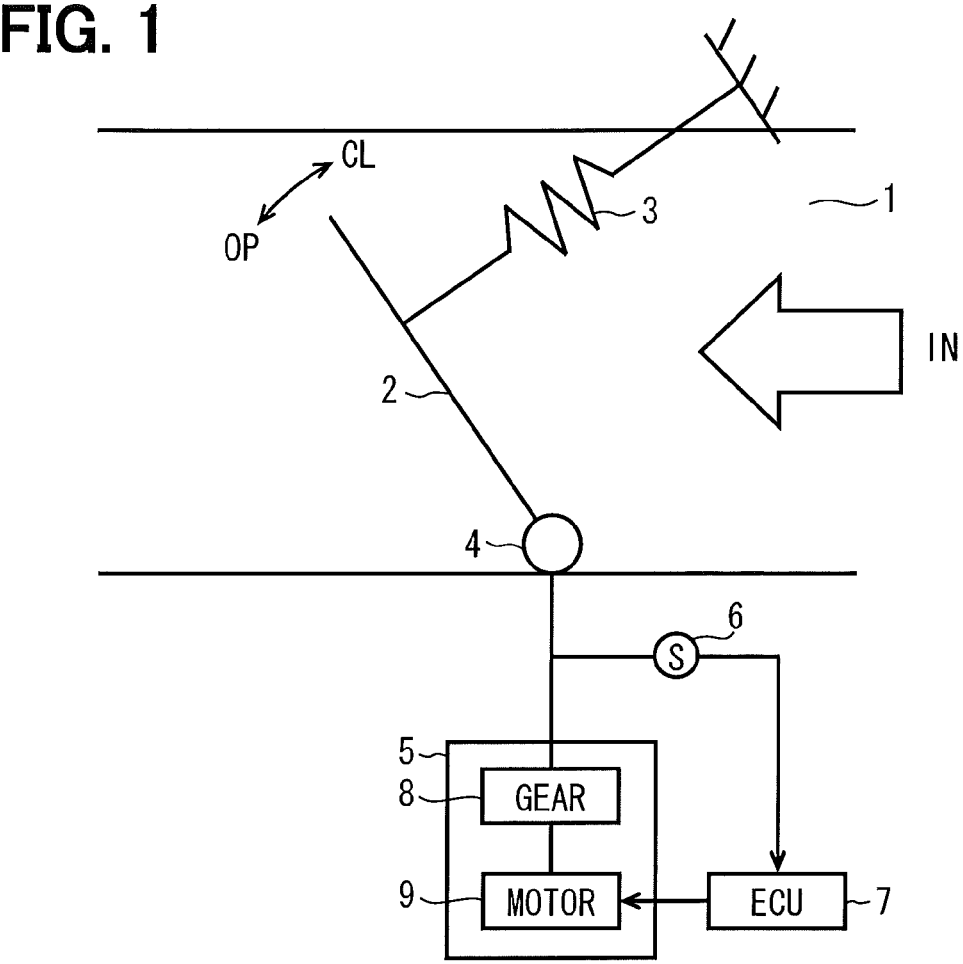
FIG. 1 is a block diagram showing an apparatus for generating engine intake air turbulence using a cantilever valve according to a first embodiment.

An apparatus for generating engine intake air turbulence has a turbulence generator valve 2 and an electric actuator 5. The apparatus may be applied to an internal combustion engine which generates rotating power by combusting fuel.

The turbulence generator valve 2 is arranged in an intake passage 1 for an engine. turbulence generator valve 2 may be arranged in an intake port or an intake manifold. The turbulence generator valve 2 generates turbulence within a combustion chamber in the engine. The turbulence generator valve 2 is referred to as a tumble flow control valve or a swirl flow control valve.

The electric actuator 5 drives the turbulence generator valve 2, e.g., rotates the turbulence generator valve 2 to adjust a valve opening degree, VD, in the intake passage 1.

The apparatus reduces an intake flow torque TA acting on the turbulence generator valve 2 by a cancel torque TC applied by the cancel spring 3. The apparatus keeps a total torque TD including the intake flow torque TA and the cancel torque TC applied to the turbulence generator valve 3 smaller than a reverse transmission torque TB while the valve opening degree of the turbulence generator valve 2 is varied.

The intake flow torque TA is a rotating torque applied to the turbulence generator valve by flow of intake air.

The reverse transmission torque TB is a rotating torque necessary to rotate the electric motor 9 in the electric actuator 5 when the electric motor is not activated. The reverse transmission torque TB is a rotating torque which is necessary to rotate the motor 9 from an output of the electric actuator 5.

The cancel torque TC is a rotating torque applied to the turbulence generator valve by the cancel spring 3.

The torques TA, TB, and TC are set to satisfy the following relationship: |TD|<|B|, where TD is a total torque of the intake flow torque TA and the cancel torque TC (TD=TA+TC).

First Embodiment

An embodiment is described with reference to the drawings. The embodiment is merely described to disclose one example of the disclosure and is not presented to limit the scope of the disclosure.

In the following embodiments, the same reference symbol may be used to indicate the same component or similar components for the same function.

Figure 2:
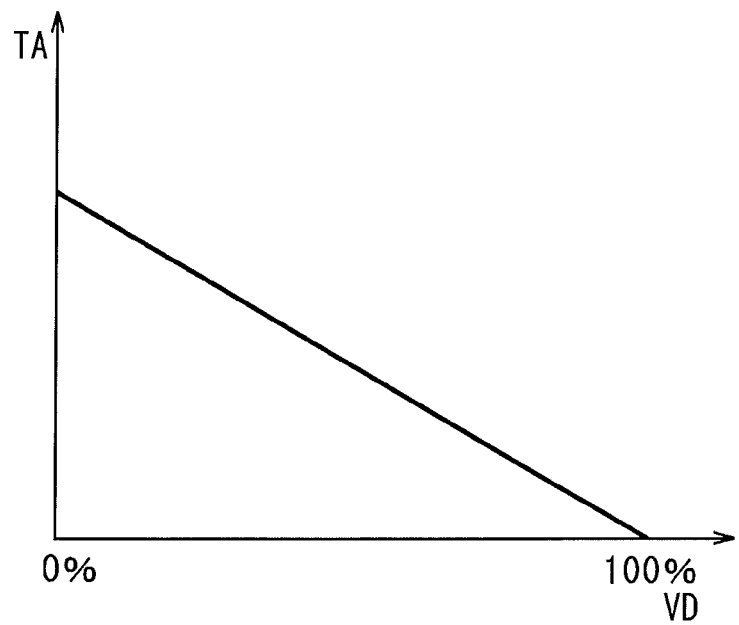
FIG. 2 is a graph showing a relationship between a valve opening degree VD and an intake flow torque TA in case of the cantilever valve.
Figure 3A:
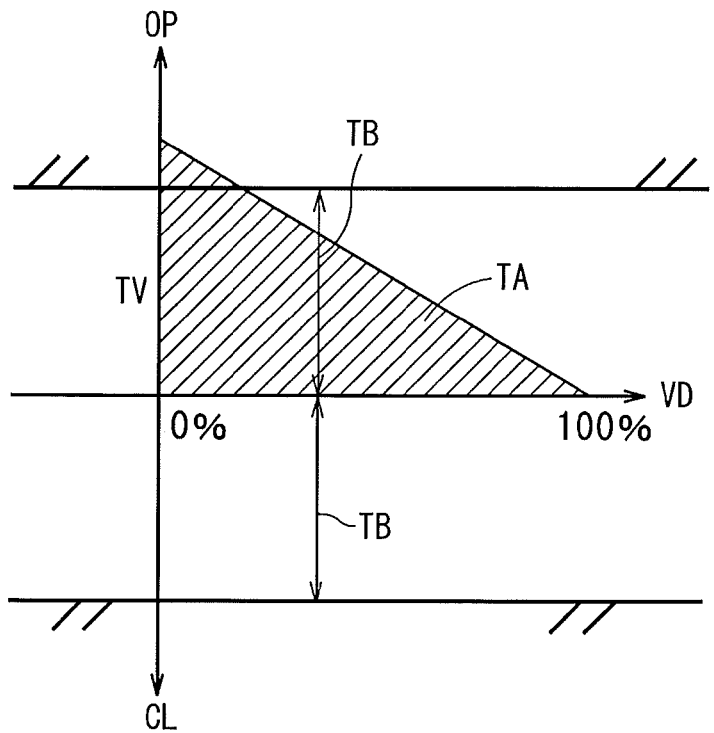
FIG. 3A is a graph showing the intake flow torque TA, and a reverse transmission torque TB on the valve opening degree VD in case of the cantilever valve.
Figure 3B:
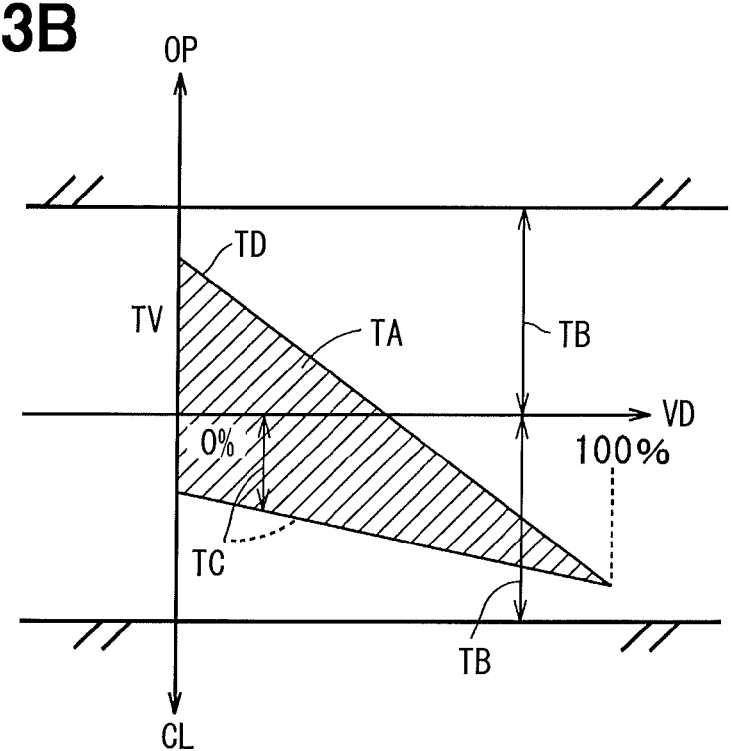
FIG. 3B is a graph showing the intake flow torque TA, the reverse transmission torque TB, and a cancel torque TC on the valve opening degree VD in case of the cantilever valve.

FIGS. 1-3 show a first embodiment. An apparatus for generating engine intake air turbulence provides a tumble flow generating apparatus. The apparatus generates tumble flow in the combustion chamber of the engine. The apparatus generates tumble flow suitable for combustion. The apparatus controls the tumble flow in accordance with engine operating condition, such as an engine revolution speed, an engine load, an engine warm-up degree. The apparatus has a TCV 2 which generates tumble flow in the combustion chamber.

The apparatus has an electric actuator 5 which drives the TCV 2 in a manner to adjust a valve opening degree VD of the TCV 2 to a target. The apparatus has an opening degree sensor 6 which detects the valve opening degree VD of the TCV 2. The apparatus has an ECU 7 which controls the electric actuator 5. ECU 7 controls power supply to the electric actuator 5 at least in an on and off manner.

TCV 2 is an abbreviation for a tumble flow control valve, and is one of examples of the turbulence generator valve. TCV 2 is a deviation generator valve for generating flow deviation in intake flow IN. TCV 2 may be disposed within an intake passage 1 which leads intake air to a combustion chamber. In a case of a multi-cylinder engine, a plurality of TCV 2 are disposed in the intake passages 1, respectively. TCV 2 may be arranged in an intake port formed in a cylinder head block. TCV 2 may be arranged in a downstream portion of an intake manifold which is connected to the intake port. Alternatively, TCV 2 may be arranged in a passage member disposed between the intake port and the intake manifold.

TCV 2 has a fixing member, e.g., a valve housing, and a rotatable shaft 4 which is supported on the valve housing by a bearing in a rotatable manner. TCV 2 has a movable valve member fixed on the rotatable shaft 4 by means for fixing, such as a screw, partial deformation, or press fitting. The movable valve member can adjust a valve opening degree VD between a fully closed position and a fully open position. The fully closed position may be referred to as 0% in VD. In the fully closed position, the movable valve member is placed on a position to open a small part of the intake passage 1. For example, TCV 2 defines a small opening on an upper part of the intake passage 1 to generate the tumble flow in the combustion chamber. Therefore, in the fully closed position, TCV 2 allows small amount of intake air flow to pass. The fully open position may be referred to as 100% in VD. In the fully open position, the movable valve member is placed on a position to open the intake passage 1 as wide as possible. TCV2 is movable in an open direction OP and a close direction CL.

As shown in FIG. 1, the TCV 2 is a cantilever valve. The cantilever valve is supported by a rotatable shaft 4 disposed on one end of a movable valve member. The cantilever valve may be referred to as a hinge type valve, or a door type valve. The cantilever valve has the movable valve member formed in a plate shape. The cantilever valve has the rotatable shaft 4 disposed on the end of the movable valve member. The cantilever valve can reduce pressure drop in the full open position, since the rotatable shaft 4 may be disposed on a wall of the intake passage 1. The valve 2 receives an intake flow torque TA by flow of intake air.

The electric actuator 5 has an electric motor 9 which generates rotating torque in response to electric power supply. Hereinafter the electric motor 9 may be simply referred to as the motor 9. The electric actuator 5 has a speed reduction mechanism 8 which slows down a rotational output of the electric motor. The speed reduction mechanism 8 amplifies the rotating torque from the motor 9 and transmits the rotating torque to the rotatable shaft 4. Hereinafter the speed reduction mechanism 8 may be simply referred to as the gear box 8. The valve 2 is driven by an electric motor 9 in an electric actuator 5. Reverse transmission torque TB is necessary to rotate the electric motor 9 in the electric actuator 5 when the electric motor 9 is not activated.

The motor 9 is a DC motor which generates output rotating torque according to an amount of current, and switches rotating direction by changing directions of current. The electric actuator 5 has the gear box 8 which slows down a rotational output of the motor 9. The gear box 8 amplifies the output torque, i.e., output rotational torque of the motor 9 by a combined set of gears and transmits output to the rotatable shaft 4. The gear box 8 has a final gear which is engaged with the rotatable shaft 4 of TCV 2.

In detail, the gear box 8 has a motor gear which is rotatable together with the motor 9. The gear box 8 has a middle gear which is driven to rotate by the motor gear. The gear box 8 has a final gear which is driven to rotate by the middle gear.

For example, the motor gear may be provided by a worm gear fixed to a rotor shaft of the motor 9. The middle gear may be provided by a combined gear in which a large diameter helical gear and a small diameter spur gear are coaxially disposed. The middle gear may be supported in a rotatable manner on a supporting shaft which is supported on a fixing member such as a valve housing. The helical gear always meshes with the motor gear. The spur gear always meshes with the final gear. In addition, the middle gear may further has a cushion member, e.g., a rubber member, between the helical gear and the spur gear in order to absorb shocks and vibrations.

The final gear may be an external gear having a large diameter and being fixed on an end of the rotatable shaft 4 of TCV 2. As a result, the gear box 8 transmits rotating torque to TCV 2 through gears in order of the motor gear, the helical gear, the spur gear, and the final gear.

The opening degree sensor 6 may be provided by a position sensor which detects the opening degree VD of TCV2 by detecting the degree of rotation angle of the rotatable shaft 4, and outputs signal indicative of the valve opening degree according to the degree of rotation angle of the rotatable shaft 4, i.e., the valve opening degree VD of TCV2 to ECU 7.

The opening degree sensor 6 may be provided by a magnetic sensor which detects the relative rotation between two components by non-contact fashion. The opening degree sensor 6 may have a magnetic flux generator which may be disposed to be rotated together with the rotatable shaft 4. The opening degree sensor 6 may have a magnetic detector which detects change in magnetic flux caused by the magnetic flux generator. The magnetic detector may be disposed on a cover which closes an opening on a housing for the gear box 8. The magnetic detector may be provided by a hall sensor integrated circuit etc.

ECU 7 is the abbreviation for an engine control unit. ECU 7 performs engine control according to engine operational status, which may include control input, such as operational amount on a gas pedal, from a driver. ECU 7 provides a control device which controls TCV 2 to adjust the valve opening degree to a target. In other words, ECU 7 controls power supply, i.e., current supply to the motor 9. ECU 7 at least turns on and off the power supply to the motor 9. ECU 7 deactivate the motor 9 by not supplying power to the motor 9.

ECU 7 has an electronic-control module which performs various kinds of operation according to engine operational status. ECU 7 also has driver unit (EDU) which turns on, turns off, and adjust amount of power supply to the motor 9 based on control signal calculated in the electronic-control module. For example, the driver unit controls voltage to be applied to the motor 9.

ECU 7 may be provided by a controller circuit using a microcomputer which may has a central processing unit and memory devices. The central processing unit performs operation processing. The memory device may provide storing means which stores data including several programs and sensor data. ECU 7 stores TCV control program which performs opening control of TCV 2 according to engine operational status. In other words, ECU 7 stores program for controlling power supply to the motor 9.

The TCV control program sets a target opening degree of TCV 2 according to engine operational status. The TCV control program controls power supply to the motor 9 so that the detected valve opening degree, an actual opening degree, of TCV 2 approaches to and becomes equal to the target opening degree. The TCV control program keeps the valve opening degree of TCV 2 by turning off power supply to the electric actuator 5 and the motor 9 after the detected valve opening degree becomes equal to the target opening degree. The TCV control program keeps turning off state until the target is changed. That is, ECU 7, i.e., the TCV control program, performs keeping control on the valve opening degree of TCV 2 by keeping turning power supply off to the electric actuator 5 and the motor 9.

A reverse transmission torque TB is necessary to rotate the motor 9 from TCV 2 via the gear box 8 by applying rotating torque to TCV 2, when the electric actuator 5 does not activated by not supplying electric power to it. In other words, the electric actuator 5 requires the reverse transmission torque TB which is a rotating torque necessary to rotate the motor 9 in the electric actuator 5 when the motor 9 is not activated.

The reverse transmission torque TB is one among (i) a detent torque which is obtained by multiplying a reduction ratio of the speed reduction mechanism 8 to a cogging torque of the electric motor 9 and (ii) a torque necessary to rotate the electric motor 9 from an output of the speed reduction mechanism 8.

The reverse transmission torque TB may be the larger one among (i) the detent torque and (ii) the torque necessary to rotate the electric motor 9 from the output of the speed reduction mechanism 8. Hereinafter, an example in which the reverse transmission torque TB is the detent torque is described.

Hereinafter, the detent torque is explained.

Since the motor 9 is the DC motor which uses permanent magnets, a rotor receives the cogging torque by the magnetic attraction force created by the permanent magnets. For this reason, in order to rotate the rotor via a shaft thereon, it is necessary to apply greater rotating torque on the shaft than the cogging torque.

In addition, the gear box 8 is disposed between the motor 9 and TCV 2. For this reason, in order to rotate the motor 9 by applying rotating torque to TCV 2, it is necessary to apply rotating torque which is greater than that obtained by multiplying a reduction ratio of the gear box 8 to the above mentioned cogging torque. In other words, in order to rotate the motor 9 from the TCV 2, the electric actuator 5 requires rotating torque which is greater than a detent torque which can be obtained by multiplying a reduction ratio of the gear box 8 to the cogging torque of the motor 9.

Thus, the detent torque may be calculated as a value which can be obtained by applying the reduction ratio of the gear box 8 to the cogging torque of the motor 9. The reverse transmission torque TB may be generated on both rotational directions of the motor 9.

On the other hand, since TCV 2 is a cantilever valve as shown in FIG. 1, it receives an intake flow torque TA by the intake air which flows through the intake passage 1. As shown in FIG. 2, the intake flow torque TA becomes the maximum when TCV 2 is fully closed, 0% in VD, and the intake flow torque TA becomes the minimum when TCV 2 is fully open, 100% in VD.

Thus, TCV 2 receives relatively large intake flow torque TA by the intake flow which flows through the intake passage 1. FIG. 3A shows a graph showing torque acting on TCV 2. A horizontal axis shows the valve opening degree VD. A vertical axis shows torque TV on the rotatable shaft 4.

As shown in FIG. 3A, the intake flow torque TA may exceed the reverse transmission torque TB (+TA>+TB). In deactivated state in which the electric actuator 5 and the motor 9 are not activated by turning power supply off, it is impossible to keep VD of TCV 2 when the intake flow torque TA is greater than the reverse transmission torque TB, i.e., the detent torque (+TA>+TB), (|TA|>|TB|). In this embodiment, it is defined that the open direction OP to open TCV 2 is positive (+), and the close direction CL to close TCV 2 is negative (−).

As shown in FIG. 1, a cancel spring 3 is provided to apply a cancel torque TC to TCV 2. The cancel spring 3 applies a cancel torque TC which acts on TCV 2 in a reverse direction to the intake flow torque TA. The intake flow torque TA acts on TCV 2 in a direction to open TCV 2. Contrary, the cancel spring 3 applies biasing force, i.e., spring force, to TCV 2 in an opposite direction to the intake flow torque TA. The cancel spring 3 applies the cancel torque TC in a direction to close TCV 2.

The cancel spring 3 may be provided by any kinds of springs, such as a swirl spring, a coil spring, and a plate spring. One end of the cancel spring 3 may be supported by a fixing member, such as a valve housing etc. In the illustrated example in FIG. 1, the other end of the cancel spring 3 is directly engaged with TCV 2. Alternatively, the other end of the cancel spring 3 may be engaged with the rotatable shaft 4 or the final gear of the gear box 8. That is, any kinds of springs may be used as the cancel spring 3 as long as it is a spring component which applies the cancel torque TC to TCV 2 in a reverse direction to the intake flow torque TA.

The cancel spring 3 is designed to apply force to TCV 2. The force is adjusted to make a torque balance about the rotatable shaft 4 in a certain condition. The cancel spring 3 is designed so that a total torque TD including the intake flow torque TA and the cancel torque TC is set smaller than the reverse transmission torque TB. The cancel spring 3 is designed to provide above mentioned relationship for an entire range of the valve opening degree VD, i.e., from 0% to 100%. In this arrangement, the cancel spring 3 applies force to TCV 2. TCV 2 receives the intake flow torque TA which is a rotating torque applied to TCV 2 by flow of intake air IN. The cancel spring 3 applies the force to TCV 2 in a reverse direction to the intake flow torque TA to apply the cancel torque TC which is a rotating torque applied to TCV 2.

The cancel torque TC is set so that a total torque TD including the intake flow torque TA and the cancel torque TC applied to TCV 2 is set smaller than the reverse transmission torque TB. In other words, the cancel spring 3 is designed to set the total torque TD within a range defined by the reverse transmission torque +TB and −TB in both directions (−TB<TD<+TB). The total torque TD may be expressed as: TD=TA+TC=(+TA)+(−TC)=+TA−TC. Therefore, the cancel spring 3 is adapted to realize the following relationship: −TB<(TD=+TA−TC)<+TB.

The torques about the rotatable shaft 4, the intake flow torque TA, the reverse transmission torque TB, and the cancel torque TC are set to satisfy: |TA+TC|<|TB|. The torques are set to satisfy the above mentioned relationship for an entire range of the valve opening degree VD, i.e., from 0% to 100%. A total torque TD (TD=TA+TC) including the intake flow torque TA and the cancel torque TC applied to the turbulence generator valve is set smaller than the reverse transmission torque TB. In other words, an absolute value of the torque TD applied to the turbulence generator valve is set smaller than an absolute value of the reverse transmission torque TB (|TD|<|TB|, |(+TA)+(−TC)|<|TB|). This criteria is satisfied for the entire range of the valve opening degree VD, i.e., from 0% to 100%.

Thereby, it is possible to keep the valve opening degree of TCV 2 even if TCV 2 receives the intake flow torque TA during the electric actuator 5 is not activated. That is, even if TCV 2 is in any valve opening degree, such as in the full close, in the full open, or in the intermediate opening, the valve opening degree of TCV 2 can be kept without activating the electric actuator 5 by supplying power to the motor 9.

TCV 2 can be stopped at a plurality of stop positions, e.g., one angular degree interval. The stop positions are defined by intervals, i.e., angle, of the cogging torque of the motor 9 and the reduction ratio of the gear box 8. The stop positions are defined by peaks of the detent torque, i.e., sags between the peaks of the detent torque. Therefore, each step of the valve opening degree of TCV 2 may correspond to each position of the detent torque. The TCV control program in ECU 7 sets the target based on the steps of the valve opening degree of TCV 2. Therefore, the target corresponds to the stop position of TCV 2 defined by the detent torque.

It is possible to adjust the valve opening degree VD of TCV 2 in each step, i.e., in each stop position. It is possible to stop TCV 2 at an intermediate position defined by the steps. It is possible to keep the valve opening degree of TCV 2 in each step during turning off power supply to the electric actuator 5. Of course, the above mentioned values are one example and can be changed suitably.

Since the valve opening degree can be kept while turning off power supply to the electric actuator 5, it is possible to reduce the frequency of operation for the electric actuator 5. As a result, it is possible to improve durability of the electric actuator 5, and reduce power consumption of the electric actuator 5.

In addition, the cancel spring 3 may reduce or eliminate backlash in a transmission train from the motor 9 to TCV 2. It is possible to reduce wearing by vibration and noise caused by the backlash.

Second Embodiment

The second embodiment is described with reference to FIG. 4, FIG. 5, and FIG. 6. In the second embodiment, the same reference symbols are used to show the same components, or components which perform the same function.

Figure 4:
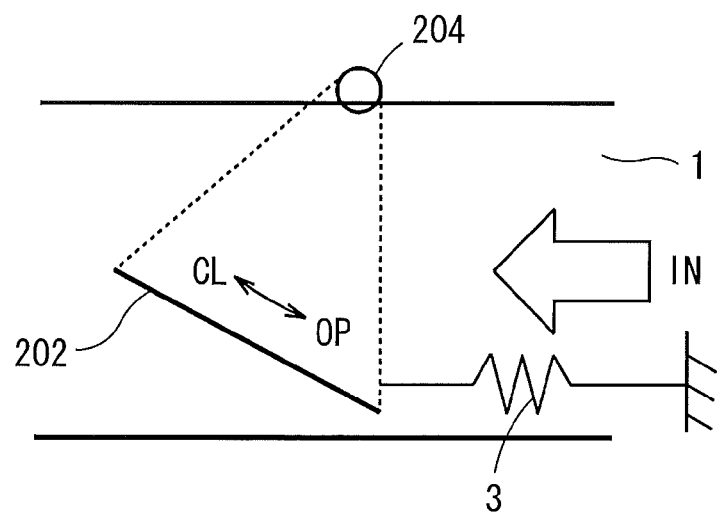
FIG. 4 is a block diagram showing an apparatus for generating engine intake air turbulence using a rotary valve according to a second embodiment.

As shown in FIG. 4, the TCV 202 in this embodiment is a rotary valve having a movable valve member which is supported by a rotatable shaft 204 disposed apart from the movable valve member. In other words, the rotatable shaft 204 is arranged at a position which is separated from the movable valve member, from both ends of the movable valve member.

Figure 5:
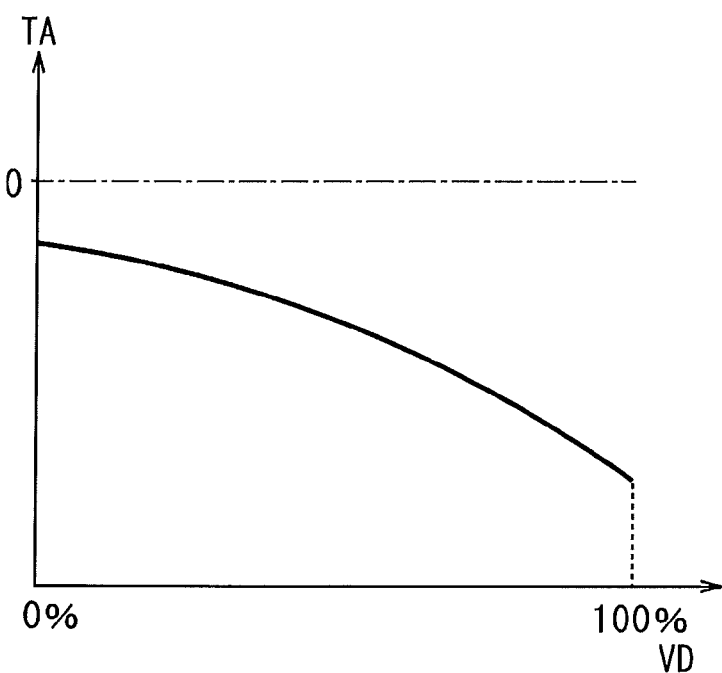
FIG. 5 is a graph showing a relationship between the valve opening degree VD and an intake flow torque TA in case of the rotary valve.

In this case, as shown in FIG. 5, the intake flow torque TA becomes the minimum when the TCV 202 is fully closed, 0% of VD, and becomes the maximum when the TCV 202 is fully opened, 100% of VD.

Figure 6A:
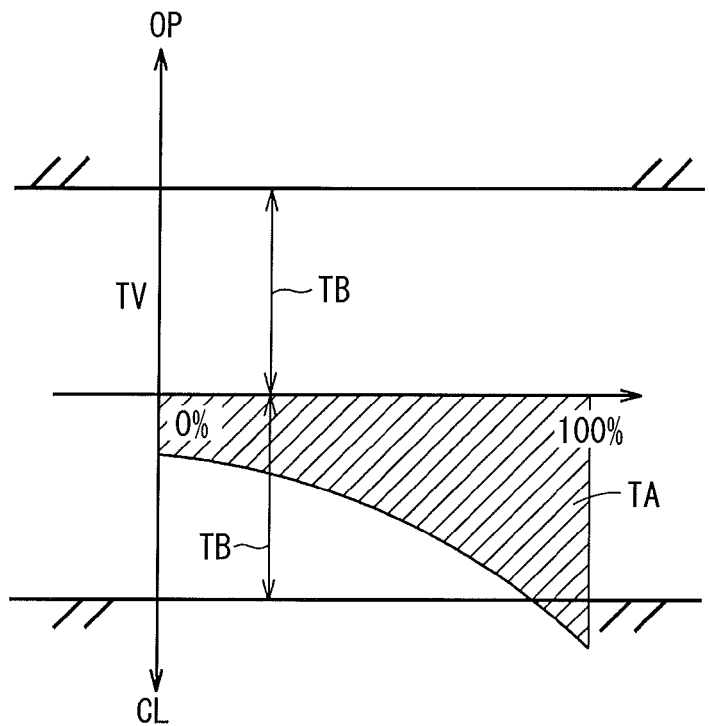
FIG. 6A is a graph showing the intake flow torque TA, and the reverse transmission torque TB on the valve opening degree VD in case of the rotary valve.

In a case of the rotary valve, TCV 202 also receives relatively large intake flow torque TA by the intake flow which flows through the intake passage 1. As shown in FIG. 6A, the intake flow torque TA may exceed the reverse transmission torque TB (−TA<−TB). In deactivated state in which the electric actuator 5 and the motor 9 are not activated by turning power supply off, it is impossible to keep VD of TCV 202 when the intake flow torque TA is greater than the reverse transmission torque TB, i.e., the detent torque (−TA<−TB), (|−TA|>|−TB|).

As shown in FIG. 4, the cancel spring 3 applies a cancel torque TC which acts on TCV 202 in a reverse direction to the intake flow torque TA. The intake flow torque TA acts on TCV 202 in a direction to close TCV 202. Contrary, the cancel spring 3 applies biasing force, i.e., spring force, to TCV 202 in an opposite direction to the intake flow torque TA. The cancel spring 3 applies the cancel torque TC in a direction to open TCV 202.

Figure 6B:
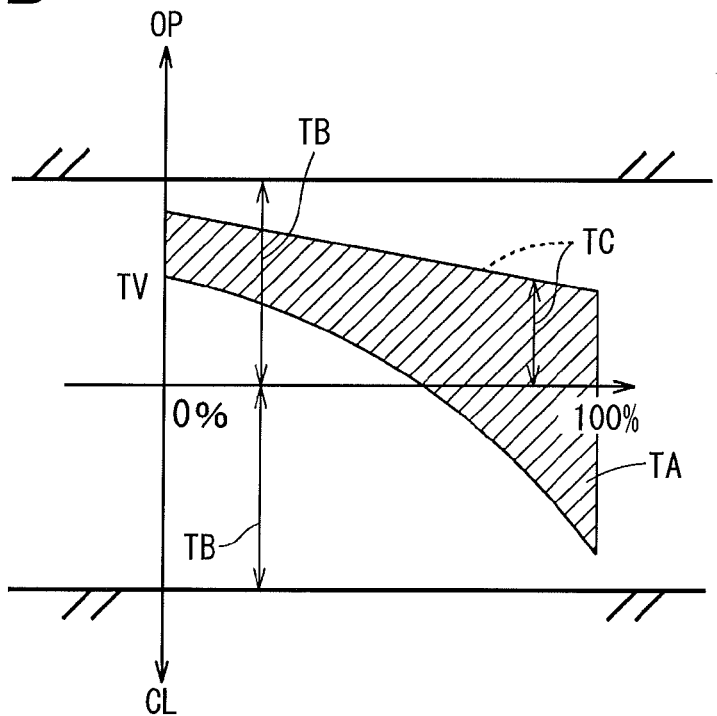
FIG. 6B is a graph showing the intake flow torque TA, the reverse transmission torque TB, and the cancel torque TC on the valve opening degree VD in case of the rotary valve.

The cancel spring 3 is designed to apply force to TCV 202. The force is adjusted to make a torque balance about the rotatable shaft 204 in a certain condition. As shown in FIG. 6B, the cancel spring 3 is designed so that a total torque TD including the intake flow torque TA and the cancel torque TC is set smaller than the reverse transmission torque TB. In other words, the cancel spring 3 is designed to set the total torque TD within a range defined by the reverse transmission torque +TB and −TB in both directions (−TB<TD<+TB). The total torque TD may be expressed as: TD=TA+TC=(−TA)+

(+TC)=−TA+TC. Therefore, the cancel spring 3 is adapted to realize the following relationship: −TB<(TD=−TA+TC)<+TB.

The torques about the rotatable shaft 204, the intake flow torque TA, the reverse transmission torque TB, and the cancel torque TC are set to satisfy: |TA+TC|<|TB|. The torques are set to satisfy the above mentioned relationship for an entire range of the valve opening degree VD, i.e., from 0% to 100%. A total torque TD (TD=TA+TC) including the intake flow torque TA and the cancel torque TC applied to the turbulence generator valve is set smaller than the reverse transmission torque TB. In other words, an absolute value of the torque TD applied to the turbulence generator valve is set smaller than an absolute value of the reverse transmission torque TB (|TD|<|TB|, |(−TA)+(+TC)|<|TB|). This criteria is satisfied for the entire range of the valve opening degree VD, i.e., from 0% to 100%.

That is, in a case that TCV 202 is the rotary valve, the valve opening degree of TCV 202 can be kept without activating the electric actuator 5, and it is possible to achieve similar advantages to the preceding embodiment.

Other Embodiment

In the above embodiments, TCV 2 are described as the turbulence generator valve. Alternatively, the turbulence generator valve may be provided by a swirl control valve for controlling swirl flow.

In the above embodiments, the reverse transmission torque TB is defined by the detent torque. Alternatively, the reverse transmission torque TB may be defined as a rotating torque which is necessary to rotate the motor 9 from an output side of the gear box 8. In this case, the valve opening degree of the turbulence generator valve is kept by setting the torque balance based on the rotating torque necessary to rotate the motor 9 from an output side of the gear box 8.

For example, the motor 9 may be provided by any kind of motors other than the DC motor using the permanent magnets. In addition, the electric actuator 5 may be provided without the speed reduction mechanism, i.e., the gear box 8.

The apparatus for generating engine intake air turbulence may be installed to either an gasoline engine which uses an ignition plug or a diesel engine which uses compression ignition.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An apparatus for generating engine intake air turbulence, comprising:

a turbulence generator valve which is arranged in an intake air passage, and generates turbulence in a cylinder of an engine, and has a rotatable shaft supported on a fixing member;

an electric actuator having an electric motor which rotates the rotatable shaft by generating rotating torque in response to electric power supply; and a cancel spring having one end supported by the fixing member and the other end engaged with the turbulence generator valve or the electric actuator, which applies force to the turbulence generator valve, wherein the turbulence generator valve receives an intake flow torque TA which is a rotating torque applied to the turbulence generator valve by flow of intake air, and wherein the electric actuator requires a reverse transmission torque TB which is a rotating torque necessary to rotate the electric motor in the electric actuator when the electric motor is not activated, and wherein the cancel spring applies the force to the turbulence generator valve in a reverse direction to the intake flow torque TA to apply a cancel torque TC which is a rotating torque applied to the turbulence generator valve, and wherein the cancel torque TC is set so that a total torque TD including the intake flow torque TA and the cancel torque TC applied to the turbulence generator valve is set smaller than the reverse transmission torque TB, the cancel torque TC being used to satisfy: |TA+TC|<|TB|, wherein the turbulence generator valve is configured to maintain a valve opening degree in any valve opening degree from full close to full open without activating the electric motor.

2. The apparatus for generating engine intake air turbulence in claim 1, wherein the electric actuator has a speed reduction mechanism which slows down a rotational output of the electric motor, and the reverse transmission torque TB is the larger one among a detent torque which is obtained by multiplying a reduction ratio of the speed reduction mechanism to a cogging torque of the electric motor and a torque necessary to rotate the electric motor from an output of the speed reduction mechanism.

3. The apparatus for generating engine intake air turbulence in claim 1, wherein the turbulence generator valve is a cantilever valve which is supported by the rotatable shaft disposed on one end of a movable valve member.

4. The apparatus for generating engine intake air turbulence in claim 1, wherein the turbulence generator valve is a rotary valve having a movable valve member which is supported by the rotatable shaft disposed apart from the movable valve member.

* * * * *